United States Patent [19]

Corbett et al.

[11] Patent Number: 5,270,183
[45] Date of Patent: Dec. 14, 1993

[54] DEVICE AND METHOD FOR THE AUTOMATED CYCLING OF SOLUTIONS BETWEEN TWO OR MORE TEMPERATURES

[75] Inventors: John M. Corbett, Drummoyne; Kenneth C. Reed, Monash, both of Australia; Arthur D. Riggs, La Verne, Calif.

[73] Assignee: Beckman Research Institute of the City of Hope, Duarte, Calif.

[21] Appl. No.: 653,659

[22] Filed: Feb. 8, 1991

[51] Int. Cl.⁵ .................. C12P 19/34; C12M 1/40
[52] U.S. Cl. .................. 435/91.2; 435/288; 435/290; 435/291; 435/316; 935/17; 935/88
[58] Field of Search .......... 435/3, 6, 91, 287, 289, 435/290, 291, 311, 316, 819, 809, 288; 935/17, 85, 86, 88, 87; 165/65, 66, 120; 422/109, 188, 189, 198, 200

[56] References Cited

U.S. PATENT DOCUMENTS

| | | | |
|---|---|---|---|
| 4,534,986 | 8/1985 | Hasting | 165/66 |
| 4,610,298 | 9/1986 | van Schagen et al. | 165/66 |
| 4,738,302 | 4/1988 | Abma | 165/66 |
| 4,865,986 | 9/1989 | Coy et al. | 435/286 |
| 4,981,801 | 1/1991 | Suzuki et al. | 435/291 |
| 5,038,852 | 8/1991 | Johnson et al. | 436/50 |
| 5,080,164 | 1/1992 | Hermans | 165/66 |

FOREIGN PATENT DOCUMENTS

| | | |
|---|---|---|
| 69180/87 | 8/1987 | Australia . |
| 8777298 | 5/1988 | Australia . |
| 60148/90 | 2/1991 | Australia . |
| WO90/05329 | 5/1990 | PCT Int'l Appl. . |
| WO91/07504 | 5/1991 | PCT Int'l Appl. . |

Primary Examiner—Michael G. Wityshyn
Assistant Examiner—William H. Beisner
Attorney, Agent, or Firm—Christie, Parker & Hale

[57] ABSTRACT

The present invention provides an apparatus and method for the amplification of a particular sequence(s) of DNA in a sample using polymerased chain reaction. The method of the present invention involves the injection of a reaction mixture into a stream of carrier fluid. The carrier fluid then passes through a plurality of temperature zones in which the polymerase chain reactions take place. The method of the present invention allows the sequential processing of a number of samples.

22 Claims, 2 Drawing Sheets

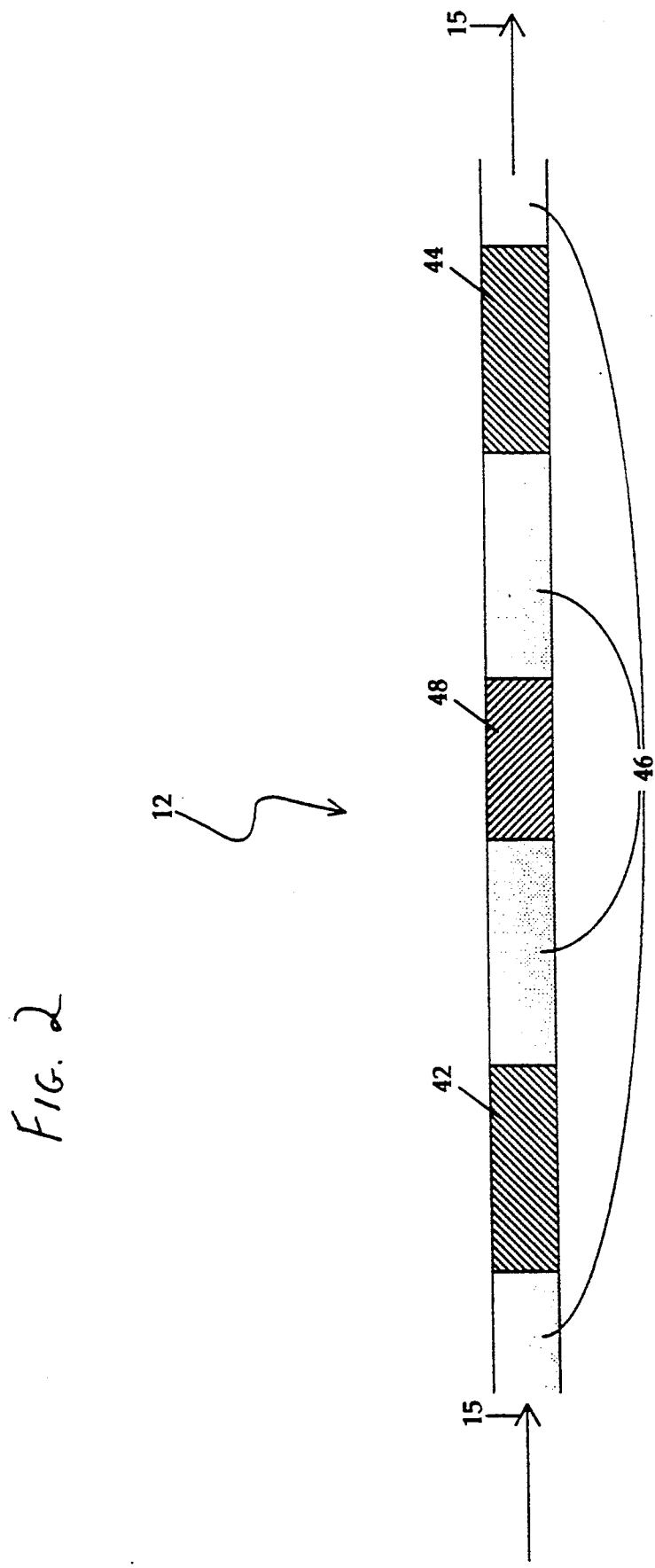

DEVICE AND METHOD FOR THE AUTOMATED CYCLING OF SOLUTIONS BETWEEN TWO OR MORE TEMPERATURES

FIELD OF THE INVENTION

The present invention relates to an apparatus and method for the automated cycling situation between two or more temperatures, with application, for example, in the amplification of nucleic acid sequences by heat-stable enzymes using thermal cycling.

BACKGROUND OF THE INVENTION

In a number of applications such as gene analysis and DNA profiling, it is desirable to multiply the amount of particular nucleic acid sequences present in the sample. For example, a duplex DNA segment of up to 5,000 base pairs in length may be amplified many million-fold by means of the polymerase chain reaction (PCR;[1]), starting from as little as a single copy [2,3].

In this technique a denatured duplex DNA sample is incubated with a molar excess of two oligonucleotide primers, one being complementary to a short sequence in one strand of the DNA duplex and the other being identical to a second short sequence upstream of it (i.e. more 5'), such that each primer anneals to its complementary sequence and primes the template-dependent synthesis by a DNA polymerase of a complementary strand which extends beyond the site of annealing of the other primer, through the incorporation of deoxynucleotide triphosphates provided. Multiple cycles of denaturation, annealing and synthesis each afford an approximate doubling of the amount of target sequence, where the target sequence is defined as the DNA sequence subtended by and including the primers. Each cycle is controlled by varying the temperature to permit successive denaturation of complementary strands of duplex DNA, annealing of the primers to their complementary sequences and primed synthesis of new complementary DNA strands. The use of a thermostable DNA polymerase obviates the necessity of adding new enzyme for each cycle [4,5], thus allowing automation of the DNA amplification process simply by thermal cycling. Twenty amplification cycles increase the amount of target sequence by approximately one million-fold (being theoretically $2^{20}$ but usually less in practice).

The oligonucleotide primers used to prime DNA synthesis in the polymerase chain reaction need not necessarily complement sequences within the DNA of the sample but may be complementary to oligonucleotides that have been ligated to the termini of DNA fragments generated from the sample DNA by digestion with a restriction endonuclease or other means [6].

The polymerase chain reaction can be implemented with thermostable DNA polymerases isolated from a number of different sources and with enzymatically-active fragments and derivatives of naturally occurring thermostable DNA polymerases. In its most usual application the polymerase chain reaction is used to amplify DNA target sequences but it can be used also to provide amplified DNA sequences corresponding to RNA target sequences by first synthesizing DNA sequences complementary to the target RNA sequences. This is achieved by primed synthesis with a class of DNA polymerase enzyme known as reverse transcriptase. Reverse transcriptases are also capable of synthesizing DNA complementary to DNA templates and so may be used for primed DNA synthesis in the polymerase chain reaction. In particular a thermostable reverse transcriptase may be used for this purpose.

For the purposes of DNA analysis the polymerase chain reaction technique offers the advantage of providing a large amount of a specific sequence of DNA, whose extremities are defined by the included primers, sufficient for detailed analysis. More detailed information regarding the polymerase chain reaction technique can be found in Innes et al 1990 [7].

A further thermal cycling technique that is used to amplify specific target nucleic acid sequences is the ligation amplification reaction (LAR). For exponential amplification with this technique, two pairs of oligonucleotides that are complementary to overlapping continuous portions of the complementary strands of a target sequence in sample DNA are ligated together in a template-dependent reaction catalysed by a DNA ligase enzyme. The duplex strands of DNA are then denatured by heating and the specific oligonucleotides again are allowed to anneal and are again ligated. Multiple cycles of denaturation, annealing and ligation each afford an approximate doubling of the amount of target sequence [8]. This procedure has particular application in discriminating between alleles that may differ by as little as a single base in their respective DNA sequences and is particularly useful in analysing the sequence of DNA products resulting from amplification of target sequences by the polymerase chain reaction [8]. The use of a thermostable DNA ligase in the ligation amplification reaction allows the procedure to be automated by thermal cycling.

Devices for use in the automated thermal cycling of reaction mixtures for amplification of nucleic acid sequences typically consist of a heat conductive material provided with vertical cylindrical channels to receive vessels in which the reaction is to take place. The vessels typically are small plastic tubes with a conical lower section and an attached lid, typically capable of holding 0.5 ml or 1.5 ml of liquid and known as "Eppendorf tubes". The heat conductive material is provided with heating/cooling means. One of the difficulties encountered in the use of such devices has been the achievement of rapid cooling of the reaction mixture. The most common solutions to this problem have been to use circulation of cold water, a standard refrigeration device, or a Peltier effect heat pump. The last named is the most desirable option but it suffers from the drawback that continual cycling between heating and cooling typically leads to failure of the Peltier effect heat pump.

Many present applications of nucleic acid amplification procedures in general and of the polymerase chain reaction in particular (and the anticipated area of most intensive application) is its use in routine, repetitive analysis of a particular sequence of genomic DNA that may be a gene or may be linked closely to a gene having sequence variants of known deleterious or beneficial effect ("gene diagnosis"). Such repetitive analyses of a single target sequence and its variants are particularly suited to automation.

Nucleic acid amplification procedures are not restricted to qualitative identification of specific nucleic acid sequences but can also be used to quantify the amount of particular nucleic acid sequences present in a sample. In particular they are commonly used to quantify the amount of RNA sequences present in a sample

[9,10]. The application of thermal cycling amplification procedures to accurate quantitative analysis of nucleic acid sequences requires that all samples be exposed to identical thermal cycles, a requirement that is not met with presently available means for thermal cycling of sample reaction mixtures.

The most critical problem in applying nucleic acid amplification procedures, particularly in repetitive diagnostic assays in a clinical laboratory, is contamination of the reaction mixture by small amounts of DNA which contain sequences capable of being amplified under the conditions of assay. The products of previous amplification reactions present a particular problem by virtue of their abundance and the fact that they comprise specific target sequences. Automation of procedures minimise the opportunity for such contamination and allows the implementation of stringent quality control.

SUMMARY OF THE INVENTION

In the first aspect the present invention consists in a method of cyclically heating and cooling a reaction mixture comprising:

i) injecting the reaction mixture into a stream of carrier fluid in which the reaction mixture is immiscible;

ii) bringing the stream of carrier fluid containing the reaction mixture into contact with a plurality of different temperature zones, each temperature zone being held at a predetermined temperature and the stream of carrier fluid being in contact with each temperature zone for a pre-determined period of time;

iii) repeating step 2 until the desired number of heating and cooling cycles have been achieved; and iv) recovering the reaction mixture from the carrier fluid.

In the second aspect the present invention consists in an apparatus for use in cyclically heating and cooling a reaction mixture, the apparatus comprising a tube adapted to carry a stream of carrier fluid, the tube being provided with an inlet port to enable injection of the reaction mixture; pump means adapted to maintain the flow of the stream of carrier fluid through the tube; a plurality of zones at differing temperatures which into contact with the tube containing the fluid stream is brought for a predetermined period of time; and recovery means adapted to allow the removal of the reaction mixture from the carrier fluid following the desired number of heating and cooling cycle being achieved.

In a third aspect the present invention consists in a method of amplifying the amount of a nucleic acid sequence present in a sample using the polymerase chain reaction. The sequence to be amplified may be a DNA sequence contained within the sample as a normal part of the DNA of the sample or it may be a fragment derived from the DNA of the sample to which oligonucleotide(s) have been ligated or it may be duplex DNA that has been synthesized such that one stand is complementary to and one strand is identical with an RNA sequence and to which oligonucleotide(s) may or may not have been ligated. The method comprises the following steps:

(i) Adding thermostable DNA polymerase (or an enzymatically active fragment thereof or an enzymatically active derivative thereof or a reverse transcriptase), suitable oligonucleotide primers, the four deoxyribonucleotide triphosphates and other desirable components to the sample to form a reaction mixture;

(ii) Injecting the reaction mixture into a stream of carrier fluid, the reaction mixture being immiscible in the carrier fluid;

(iii) Bringing the stream of the carrier fluid containing the reaction mixture into contact with a plurality of different temperature zones, the temperature of the different temperature zones and the time the carrier fluid containing the reaction mixture is in contact with the individual temperature zones being selected such that the following reactions take place in the reaction mixture: (a) denaturation of the DNA strands in the sample, (b) annealing of the oligonucleotide primers with complementary sequences in the sample DNA, and (c) primed synthesis of new strands of complementary DNA that each extend beyond the site of annealing of the alternate primer;

(iv) Repeating step (iii) until the desired level of amplification has been achieved; and (v) Recovering the reaction mixture from the carrier fluid.

In a fourth aspect the present invention consists in a device for use in amplifying the amount of specific target DNA sequence(s) present in a sample using the polymerase chain reaction, the device comprising a tube adapted to carry a stream of carrier fluid, the tube being provided with an inlet port to enable injection of a reaction mixture comprising the sample, thermostable DNA polymerase (or an enzymatically active fragment thereof or an enzymatically active derivative thereof or a reverse transcriptase), suitable oligonucleotide primers, the four deoxyribonucleotide triphosphates and other desirable components into the carrier fluid; pump means adapted to maintain the flow of the carrier fluid through the tube; a plurality of zones at differing temperatures into contact with which the tube containing the stream of carrier fluid is brought, the differing temperatures and the time for which the carrier fluid stream containing the reaction mixture is in contact with the individual zones b ring selected such that the following reactions take place in the reaction mixture: (a) denaturation of the DNA strands in the sample, (b) annealing of the oligonucleotide primers with complementary sequences in the sample DNA, and (c) primed synthesis of new strands of complementary DNA that each extend beyond the site of annealing of the alternate primer; and recovery means adapted to allow removal of the reaction mixture from the carrier fluid following amplification of the specific target DNA sequence(s) present in the sample.

In a preferred embodiment of the present invention there is provided an in-line analysis means downstream of the plurality of zones at differing temperatures. The in-line analysis means determines the extent of amplification which has occurred in the reaction mixture and may additionally determine the specificity of amplification of defined target DNA sequence(s).

In a preferred embodiment of the present invention there are two or three, and most preferably two, zones of differing temperature. Where there are three zones of differing temperature it is preferred that one zone is at about 94° C., one zone at about 60° C. and one zone at about 73° C. It is preferred that the time taken for the fluid carrier stream containing the reaction mixture to pass through these three zones is about 20 seconds, about 10 seconds and about 2 minutes, respectively.

However, the most suitable temperatures of the three differing zones and the most suitable time taken for the fluid carrier stream containing the reaction mixture to pass through these three zones is dependent on the enzyme used for DNA synthesis, the sequence composition of the oligonucleotide primers and the sequence composition of the defined target DNA sequence(s) in the sample.

Where there are two zones of differing temperature it is preferred that these zones are at about 94° C. and at about 70° C. and that the time taken for the fluid carrier stream containing the reaction mixture to pass through these two zones is about 30 seconds and about 2 minutes, respectively. However, the most suitable temperatures for the two differing zones and the most suitable time taken for the fluid carrier stream containing the reaction mixture to pass through these two zones is dependent on the enzyme used for DNA synthesis, the sequence composition of the oligonucleotide primers and the sequence composition of the defined target DNA sequence(s) in the sample.

In a fifth aspect the present invention consists in a method of amplifying the amount of a nucleic acid sequence present in a sample using the ligation amplification reaction. The sequence to be amplified may be a DNA sequence contained within the sample as a normal part of the DNA of the sample or it may be duplex DNA that has been synthesized such that one stand is complementary to and one strand is identical with an RNA sequence. The method comprises the following steps:

(i) Adding thermostable DNA ligase (or an enzymatically active fragment thereof or an enzymatically active derivative thereof), suitable oligonucleotides, ATP or similar required nucleotide and other desirable components to the sample to form a reaction mixture;

(ii) Injecting the reaction mixture into a stream of carrier fluid, the reaction mixture being immiscible in the carrier fluid;

(iii) Bringing the stream of the carrier fluid containing the reaction mixture into contact with a plurality of different temperature zones, the temperature of the different temperature zones and the time the carrier fluid containing the reaction mixture is in contact with the individual temperature zones being selected such that the following reactions take place sequentially in the reaction mixture: (a) denaturation of the DNA strands in the sample, (b) annealing of the oligonucleotides with complementary sequences in the sample DNA, and (c) ligation of adjacent annealed oligonucleotides;

(iv) Repeating step (iii) until the desired level of amplification has been achieved; and (v) Recovering the reaction mixture from the carrier fluid.

In a sixth aspect the present invention consists in a device for use in amplifying the amount of specific target DNA sequence(s) present in a sample using the ligation amplification reaction, the device comprising a tube adapted to carry a stream of carrier fluid, the tube being provided with an inlet port to enable injection of a reaction mixture comprising the sample, thermostable DNA ligase (or an enzymatically active fragment thereof or an enzymatically active derivative thereof), suitable oligonucleotides, ATP or similar required nucleotide and other desirable components into the carrier fluid; pump means adapted to maintain the flow of the carrier fluid through the tube; a plurality of zones at differing temperatures into contact with which the tube containing the stream of carrier fluid is brought, the differing temperatures and the time for which the carrier fluid stream containing the reaction mixture is in contact with the individual zones being selected such that the following reactions take place in the reaction mixture: (a) denaturation of the DNA strands in the sample, (b) annealing of the oligonucleotides with complementary sequences in the sample DNA, and (c) ligation of adjacent annealed oligonucleotides; and recovery means adapted to allow removal of the reaction mixture from the carrier fluid following amplification of the specific target DNA sequence(s) present in the sample.

In a preferred embodiment of the present invention there is provided an in-line analysis means downstream of the plurality of zones at differing temperatures. The in-line analysis means determines the extent of amplification which has occurred in the reaction mixture and may additionally determine the specificity of amplification of defined target DNA sequence(s).

The number of differing temperature zones, the most suitable temperatures for the differing zones and the most suitable time taken for the fluid carrier stream containing the reaction mixture to pass through these zones is dependent on the enzyme used for DNA ligation and the sequence composition of the oligonucleotides.

Whilst the cycling of a reaction mixture from one temperature zone to another may be achieved by arranging a number of individual temperature zones along the fluid stream path, it is presently preferred that there are simply two or three individual temperature zones and the stream of carrier fluid, by following a convoluted path, flows through or into contact with the individual temperature zones a plurality of times. In the situation where there are two individual temperature zones the fluid path goes from the first temperature zone to the second temperature zone from where it flows back to the first temperature zone and so on.

In a particularly preferred arrangement the individual temperature zones are cylinders with the tube carrying the carrier fluid being wrapped around individual cylinders within enclosed vessels. For example, the tube may be wrapped around a cylinder at 94° C. once from where it passes to a cylinder of similar diameter at 70° C. around which it is wrapped four times. By simply varying the diameter of the cylinders and the number of times the tube passes around a particular cylinder the time that the reaction mixture is in contact with the cylinder can be varied. The cylinders around which the tube is wrapped may be provided with thermostatically controlled heating/cooling means or the cylinders with the tube wrapped around them may be immersed in an enclosed vessel of fluid that is provided with thermostatically controlled heating/cooling means.

Due to the fact that the reaction mixture is immiscible in the carrier fluid, the reaction mixture passes along with the fluid stream as a discrete pocket or plug. As will be readily envisaged, this enables the method and apparatus of the present invention to be used in sequential processing of multiple samples. This is achieved by simply spacing the reaction mixtures along the stream of carrier fluid by spacing the injection of different reaction mixtures in time.

Whilst the separation of the different reaction mixtures by carrier fluid is generally sufficient to ensure against mixing of the separate reaction mixtures, it is presently preferred that a pocket or plug of purging solution destructive to DNA such as sodium hypochlorite or hydrochloric acid is provided in the carrier stream between the individual reaction mixtures. As will be envisaged, any carry-over of DNA from one region mixture to the next will be substantially prevented from adversely affecting the procedure in the second reaction mixture by its destruction by the purging solution. It is also preferred that this purging solution is introduced into the fluid stream through the same inlet port through which the reaction mixtures are introduced into the fluid stream. This serves to prevent any carry-over of one reaction mixture to another which may occur by virtue of contamination of the inlet port with DNA components of a previous reaction mixture.

As stated above, individual reaction mixtures are separated by a volume of carrier fluid. In order to prevent mixing of one reaction mixture with a subsequent reaction mixture it is preferable that back pressure is exerted on the fluid stream to prevent vaporisation of the fluid stream and reaction mixtures as they pass through the zone(s) of high temperature. This is preferably achieved by the provision of back pressure means at the end of the fluid stream.

In addition, to aid in preventing mixing of reaction mixtures it is preferred that the flow rate and cross-sectional diameter of the fluid stream are such that turbulent flow is avoided and laminar flow is achieved. Tubing of small diameter is particularly preferred since it is beneficial to rapid heat transfer.

The carrier fluid may be any of a number of fluids in which the reaction mixture is immiscible. However, it is presently preferred that the carrier fluid is either a silicone oil or mineral oil.

In yet a further preferred embodiment the fluid stream containing the reaction mixture is brought into contact with a cooling zone after the desired number of cycles has been completed.

BRIEF DESCRIPTION OF THE DRAWINGS

In order that the nature of the present invention may be more clearly understood, a preferred form thereof as used for the polymerase chain reaction will now be described with reference to the accompanying drawings in which:

FIG. 2 is an expanded view of tube 12 of FIG. 1.

DETAILED DESCRIPTION OF THE INVENTION

Figure 1:
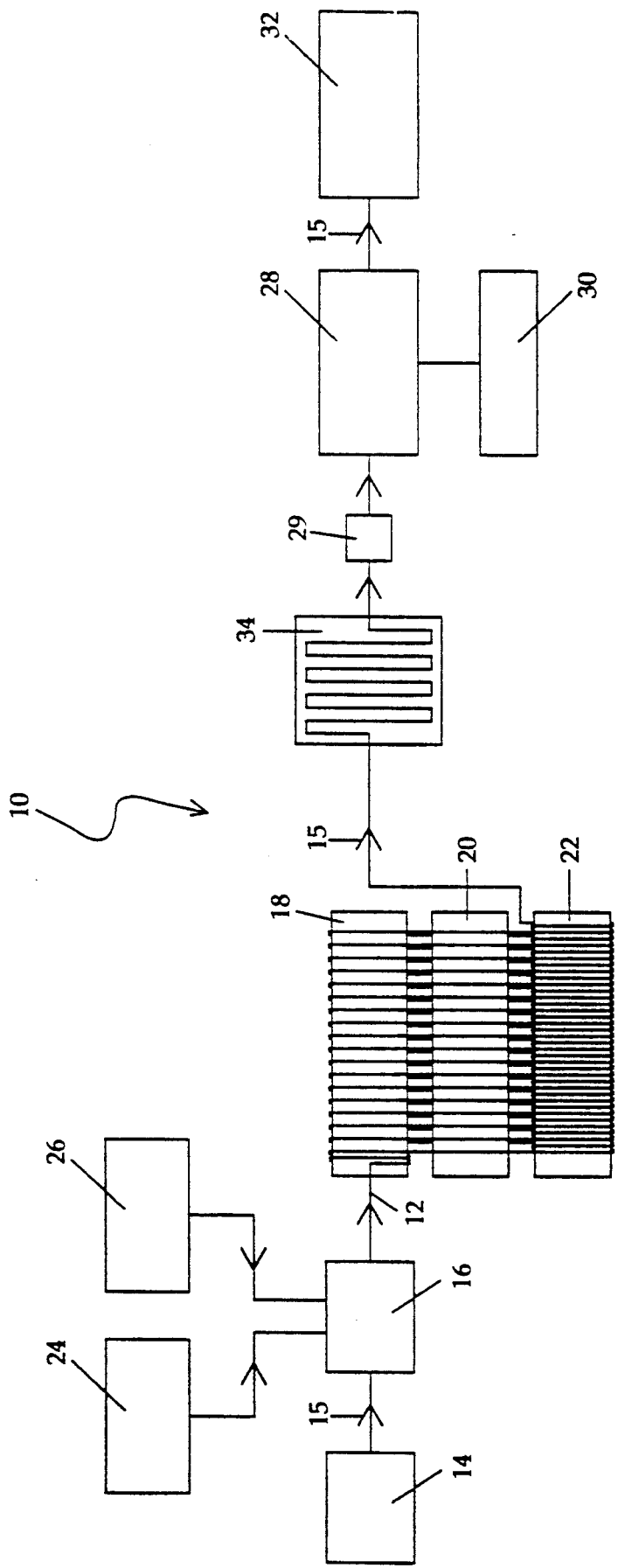
FIG. 1 is a schematic representation of a preferred embodiment of the apparatus of the present invention.

As is shown in FIG. 1, the apparatus 10 comprises tube 12 through which a fluid stream passes. As is more clearly shown in FIG. 2, the fluid stream includes pockets of reaction mixtures 42 and 44 and purging solution 48 separated by carrier fluid 46.

Provided at one end of tube 12 is pump means 14. The pump means maintains the flow of liquid along tube 12 in the direction shown by arrows 15. Provided on tube 12 is inlet port 16 through which reaction mixture is injected by means 24 and purging solution is injected by means 26.

The apparatus 10 includes temperature zones 18, 20 and 22. The temperature of zone 18 is approximately 94° C., the temperature of zone 20 is approximately 60° C. and the temperature of zone 22 is approximately 73° C. Tube 12 is arranged between temperature zones 18, 20 and 22 such that the tube passes back and forth between the zones a plurality of times and has a different length in each zone depending on the residence of flowing fluid required. Downstream of temperature zones 18, 20 and 22 is temperature zone 34 which is typically at ambient temperature but may be at 4° C. or thereabouts.

Downstream of temperature zone 34 is in-line analysis means 29 and recovery means 28. Connected to recovery means 28 is detection means 30. Detection means 30 determines when a reaction mixture in the carrier fluid reaches recovery means 28. This may be done by measuring the conductivity or optical density of the stream of carrier fluid. As the conductivity and optical density of the reaction mixtures differ from those of the carrier fluid the arrival of a reaction mixture at the recovery means 28 may be readily detected. Upon detection of a reaction mixture recovery means 28 is actuated and the reaction mixture is recovered from the fluid stream.

At the end of tube 12 remote from pump means 14 is provided back pressure device 32. This enables a positive pressure to be maintained throughout tube 12 which prevents bubble formation due to vaporisation in the fluid stream in any of temperature zones 18, 20 or 22.

In operation, pump means is actuated and carrier fluid is pumped through tube 12 which is arranged between temperature zones 18, 20 and 22 such that tube 12 passes back and forth between zones 18, 20 and 22 up to forty times and may have a different length in each of zones 18, 20 and 22 depending on the residence time of flowing fluid required.

A reaction mixture comprising the sample containing the DNA sequence(s) to be amplified, thermostable DNA polymerase (or an enzymatically active fragment thereof or an enzymatically active derivative thereof or a reverse transcriptase), oligonucleotide primers, the four deoxyribonucleotide triphosphates and other desirable components in a small volume, approximately 5–20 ul, is injected by means 24 into tube 12 via inlet port 16. The carrier fluid 46 carries the reaction mixture 44 through temperature zone 18, in which DNA strands are denatured, to temperature zone 20, where annealing of the oligonucleotide primers takes place, to temperature zone 22, where synthesis of new DNA stands takes place, then back to temperature zone 18.

A small volume of purging solution 48 is injected after reaction mixture 44 by means 26 into tube 12 via inlet port 16. The next reaction mixture 42 is then injected by means 24 into tube 12 via inlet port 16. These processes can be repeated continuously at intervals of a few seconds, depending on the flow rate along tube 12.

After multiple passes through zones 18, 20 and 22 the amplified reaction mixtures 44 and 42 are cooled by means 34 and then reach in-line analysis means 29 where the degree of amplification is assessed and the specificity of amplification may be assessed. From in-line analysis means 29 reaction mixtures 44 and 42 pass to recovery means 28 where their presence is detected by detection means 30. This actuates the recovery means 28 and the amplified samples are recovered from the fluid stream in tube 12. Positioned downstream of recovery means 28 is back pressure means 32. The back pressure means 32 maintain system pressure at approximately 60-100 PSIG to prevent bubble formation in the reaction mixture or carrier fluid.

In order that the nature of the present invention may be more clearly understood, a preferred form thereof utilising the polymerase chain reaction will now be described with reference to the following proposed example.

EXAMPLE

The sample containing the DNA sequences to be amplified is mixed with thermostable DNA polymerase, suitable oligonucleotide primers, deoxyadenosine triphosphate (dATP), deoxycytidine triphosphate (dCTP), deoxyguanosine triphosphate (dGTP) and deoxythymidine triphosphate (dTTP) and other desirable components in a volume of 25 µl or less, depending on the volume to be injected.

Two heated zones are set up, one at 94° C. and one at 70° C. A pump which delivers a flow rate of 100 µl per minute is connected to a tube composed of material inert to both the reaction mixture and carrier fluid. The tube is arranged so that the residence time of flowing fluid is five minutes at 94° C. The tube then passes to the 70° C. zone such that the residence time of flowing fluid is two minutes and then passes back to the 94° C. zone such that the residence time of flowing fluid is 30 seconds. The tube passes back and forth in this arrangement (two minutes fluid residence at 70° then 30 second fluid residence at 94° C.) twenty to forty times, depending on the extent of amplification required. After leaving the 70° C. zone for the final time the tube then passes through a cooling zone and then via the sample collection valve to the back pressure device.

The pump is actuated and the reaction mixture of 20 µl or less is injected into the mineral oil or silicone oil carrier fluid and specific DNA sequences (whose limits are defined by the oligonucleotide primers) present in the sample is amplified as it passes cyclically through the temperature zones.

A few seconds after a reaction mixture is injected a small amount (5 µl) of purging reagent, e.g. sodium hydrochloric or hydrochloric acid, is injected into the tube. This is separated from the reaction mixture by carrier fluid that has flowed by in the time between successive injection of the reaction mixture and the purging reagent. After a similar delay another reaction mixture is injected and the process repeated. In this manner many samples may be amplified without possibility of carry-over from one sample to another. In particular, amplified products of one sample are not at any stage in contact with or proximate to unamplified components of another sample. Successive samples can be applied at intervals of 30 seconds or less and after the total reaction time emerge amplified and be recovered at intervals of 30 second or less.

The apparatus and method of the present invention provides a rapid and automated means by which DNA sequences in a large number of samples can be amplified in continuous sequence by thermostable enzymes using thermal cycling. As stated previously, one of the main drawbacks encountered in prior art devices for the amplifications of nucleic acid sequences by means of thermal cycling is achieving rapid and uniform heating and cooling of the reaction mixtures. In the present invention the high surface area to volume ratio of the fluid stream enables a rapid transfer of heat to and from the reaction mixtures, all of which are subjected to identical thermal environments. The last consideration is of particular value in the application of nucleic acid amplification procedures to the quantification of defined nucleic acid sequences.

The apparatus and method of the present invention provides the further advantages that the application of samples can be automated with an automated sample injection device, thereby minimising both the number of manual procedures required and the opportunity for inadvertent contamination while increasing the opportunity for quality control. The further possibility exists for inclusion of an automated means for in-line analysis of the amplified reaction product(s).

The automated injection of samples may be further accomplished by injection of DNA sample into a plug of reaction mixture containing thermostable DNA polymerase, suitable oligonucleotide primers, the four deoxyribonucleotide triphosphates and other desirable components.

The individual temperature zones may be formed of any material of relatively high thermal conductivity. Alternatively, the individual temperature zones may be fluid-filled baths maintained thermostatically at the required temperature.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

References

1. Saiki, R. K., Scharf, S., Faloona, F., Mullis, K. B., Horn, G. T., Erlich, H. A. and Arnheim, N. (1985) Enzymatic amplification of β-globin genomic sequences and restriction site analysis for diagnosis of sickle cell anemia, Science 230, 1350–1354.
2. Li, H., Gyllensten, U. B., Cui, X., Saiki, R. K., Erlich, H. A. and Arnheim, N. (1988) Amplification and analysis of DNA sequences in single human sperm and diploid cells, Nature 335, 414–417.
3. Holding, C. and Monk, M. (1989) Diagnosis of beta-thalassaemia by DNA amplification in single blastomeres from mouse preimplantation embryos, Lancet ii, 532–535.
4. Name not given (1987) Purified thermostable enzyme, Australian Patent Applic. No. 77298/87.
5. Saiki, R. K., Gelfand, D. H., Stoffel, S., Scharf, S. J., Higuchi, R., Horn, G. T., Mullis, K. B. and Erlich, H. A. (1988) Primer-directed enzymatic amplification of DNA with a thermostable DNA polymerase, Science 239, 487–491.
6. Steigerwald, S. D., Pfeifer, G. P. and Riggs, A. D. (1990) Ligation-mediated PCR improves the sensitivity of methylation analysis by restriction enzymes and detection of specific DNA strand breaks, Nucl. Acids Res. 18, 1435–1439.
7. Innis, M. A., Gelfand, D. H., Sninsky J. J. and White, T. J., Eds. (1990) "PCR Protocols. A Guide to Methods and Applications". (Academic Press, Inc., San Diego Calif.).
8. Wu, D. Y. and Wallace, R. B. (1989) The ligation amplification reaction (LAR)—Amplification of specific DNA sequences using sequential rounds of template-dependent ligation, Genomics 4, 560–569.
9. Singer-Sam, J., Robinson, M. O., Bellve, A. R., Simon, M. I. and Riggs, A. D. (1990) Measurement by quantitative PCR of changes in HPRT, PGK-1, PGK-2, APRT, MTase, and Zfy gene transcripts during mouse spermatogenesis, Nucl. Acids Res. 18, 1256–1259.

10. Chelly, J., Montarras, D., Pinset, C., Berwald-Netter, Y., Kaplan, J.-C. and Kahn, A. (1990) Quantitative estimation of minor mRNAs by cDNA-polymerase chain reaction. Application to dystrophin mRNA in cultured myogenic and brain cells, Eur. J. Biochem. 187, 691–698.

We claim:

1. A method of amplifying an amount of DNA present in a sample using a polymerase chain reaction comprising the following steps:
   i) adding oligonucleotide primers, deoxyadenosine triphosphate (dATP), deoxycytidine triphosphate (dCTP), deoxyguanosine triphosphate (dGTP), deoxythymidine triphosphate (dTTP), and at least one of a thermostable DNA polymerase, enzymatically active fragments thereof, an enzymatically active derivative thereof and a reverse transcriptase to a DNA containing sample to form a first reaction mixture;
   ii) injecting the reaction mixture into a stream of carrier fluid in which the reaction mixture is immiscible;
   iii) passing the stream of carrier fluid containing the reaction mixture through a plurality of different temperature zones, the temperature of the different temperature zones and the time taken for the carrier fluid containing the reaction mixture to pass through the individual temperature zones being selected such that the following reactions take place in the reaction mixture:
      (a) denaturation of the DNA into its component strands;
      (b) annealing of the oligonucleotide primers to complementary sequences in the DNA; and
      (c) synthesis of new DNA strands;
   iv) repeating step iii) until a desired level of amplification has been achieved; and
   v) recovering the reaction mixture from the carrier fluid.

2. A method as claimed in claim 1 in which prior to step v) at least one of an extent or specificity of amplification of the DNA in the reaction mixture is assessed by in-line analysis means.

3. A method as claimed in claim 1 in which there are a first, a second and a third temperature zone at temperatures of about 94° C., 60° C. and 73° C., respectively, and the carrier fluid cyclically passes through the three temperature zones.

4. A method as claimed in claim 1 in which there are a first and a second temperature zone at temperatures of about 94° C. and about 70° C., respectively, and the carrier fluid cyclically passes through the two temperature zones.

5. A method as claimed in claim 1 in which a second reaction mixture is injected into the stream of carrier fluid upstream of the first reaction mixture, the two reaction mixtures being separated by the carrier fluid.

6. A method as claimed in claim 5 in which a purging reagent destructive to DNA is injected into the stream of carrier fluid between the two reaction mixtures.

7. A method as claimed in claim 1 in which, prior to step (v), the carrier fluid passes through a cooling zone such that the reaction mixture is cooled.

8. An apparatus for use in amplifying an amount of DNA present in a sample using a polymerase chain reaction, the apparatus comprising a tube constructed so as to carry a stream of carrier fluid, the tube being provided with an inlet port to enable injection of reaction mixtures comprising a DNA containing sample, oligonucleotide primers, deoxyadenosine triphosphate (dATP), deoxycytidine triphosphate (dCTP), deoxyguanosine triphosphate (dGTP), deoxythymidine triphosphate (dTTP), and at least one of a thermostable DNA polymerase, enzymatically active fragments thereof, an enzymatically active derivative thereof and a reverse transcriptase into the carrier fluid; pump means constructed so as to maintain a flow of the stream of carrier fluid through the tube; a plurality of different temperature zones through which the tube containing the carrier fluid cyclically passes, the different temperatures and the time taken for the carrier fluid containing the reaction mixtures to pass through the individual zones being selected such that the following reactions take place in the reaction mixtures:
   (a) denaturation of the DNA in the sample into its component strands,
   (b) annealing of the oligonucleotide primers with complementary sequences in the DNA, and
   (c) synthesis of new DNA strands; recovery means constructed so as to allow removal of the reaction mixtures from the carrier fluid following amplification of the DNA present in the sample; and an in-line analysis means constructed so as to assess at least one of an extent and specificity of amplification in the reaction mixtures the in-line analysis means including means to detect at least the presence of DNA in the tube, the in-line analysis means being positioned between the different temperature zones and the recovery means.

9. An apparatus as claimed in claim 8 in which there are a first, a second and a third temperature zone at temperatures of about 94° C., 60° C. and 73° C., respectively, and the tube cyclically passes through the three temperature zones.

10. An apparatus as claimed in claim 8 in which there are a first and a second temperature zone at temperatures of about 94° C. and 70° C., respectively, and the tube cyclically passes through the two temperature zones.

11. An apparatus as claimed in claim 8 in which the apparatus includes a cooling zone through which the tube passes prior to reaching the recovery means.

12. A method of amplifying an amount of DNA present in a sample using a ligation amplification reaction comprising the following steps:
   (i) adding oligonucleotides, deoxyadenosine triphosphate (dATP), deoxycytidine triphosphate (dCTP), deoxyguanosine triphosphate (dGTP), deoxythymidine triphosphate (dTTP), and at least one of a thermostable DNA ligase, an enzymatically active fragment thereof, and an enzymatically active derivative thereof to a DNA containing sample to form a first reaction mixture;
   (ii) injecting the reaction mixture into a stream of carrier fluid, the reaction mixture being immiscible in the carrier fluid;
   (iii) passing the stream of carrier fluid containing the reaction mixture through a plurality of different temperature zones, the temperature of the different temperature zones and the time taken for the carrier fluid containing the reaction mixture to pass through the individual temperature zones being selected such that the following reactions take place sequentially in the reaction mixture: (a) denaturation of the DNA into its component strands, (b) annealing of the oligonucleotides to complementary sequences in the DNA, and (c) ligation of adjacent oligonucleotides;

(iv) repeating step (iii) until a desired level of amplification has been achieved; and (v) recovering the reaction mixture from the carrier fluid.

13. A method as claimed in claim 12 in which prior to step (v) at least an extent or specificity of amplification of the DNA in the reaction mixture is assessed by in-line analysis means.

14. A method as claimed in claim 12 in which there are a first, a second, and a third temperature zone at temperatures of about 94° C., 60° C. and 73° C., respectively, and the carrier fluid cyclically passes through the three temperature zones.

15. A method as claimed in claim 12 in which there are a first and a second temperature zone at temperatures of about 94° C. and 70° C., respectively, and the carrier fluid cyclically passes through the two temperature zones.

16. A method as claimed in claim 12 in which a second reaction mixture is injected into the stream of carrier fluid upstream of the first reaction mixture.

17. A method as claimed in claim 16 in which a purging reagent destructive to DNA is injected into the stream of carrier fluid between the two reaction mixtures, being separated from each other by the carrier fluid.

18. A method as claimed in claim 12 in which, prior to step (v), the carrier fluid passes through a cooling zone such that the reaction mixture is cooled.

19. An apparatus for use in amplifying an amount of DNA present in a sample using a ligation amplification reaction, the apparatus comprising a tube constructed so as to carry a stream of carrier fluid, the tub being provided with an inlet port to enable injection of a reaction mixture comprising a DNA containing sample, oligonucleotides, deoxyadenosine triphosphate (dATP), deoxycytidine triphosphate (dCTP), deoxyguanosine triphosphate (dGTP), deoxythymidine triphosphate (dTTP), and at least one of a thermostable DNA ligase, an enzymatically active fragment thereof, and an enzymatically active derivative thereof into the carrier fluid; pump means constructed so as to maintain a flow of the stream of carrier fluid through the tube; a plurality of different temperature zones through which the tube containing the carrier fluid cyclically passes, the different temperatures and the time taken for the carrier fluid containing the reaction mixture to pass through the individual zones being selected such that the following reactions take place in the reaction mixture:

(a) denaturation of the DNA into its component strands, (b) annealing of the oligonucleotides with complementary sequences in the DNA, and (c) ligation of adjacent oligonucleotides;

recovery means adapted to allow removal of the reaction mixture from the tube following amplification of the DNA present in the sample; and in-line analysis means constructed so as to assess at least one of an extent and specificity of amplification in the reaction mixture, the in-line analysis means comprising means to at least detect the presence of DNA in the tube, the in-line analysis means being positioned between the different temperature zones and the recovery means.

20. An apparatus as claimed in claim 19 in which there are a first, a second, and a third temperature zone at temperatures of about 94° C., 60° C., and 73° C., respectively, and the tube cyclically passes through the three temperature zones.

21. An apparatus as claimed in claim 19 in which there are a first and a second temperature zone at temperatures of about 94° C. and about 70° C., respectively, and the tube cyclically passes through the two temperature zones.

22. An apparatus as claimed in claim 19 in which the apparatus includes a cooling zone through which the tube passes prior to reaching the recovery means.

* * * * *